(12) United States Patent
Cloos et al.

(10) Patent No.: US 10,145,318 B2
(45) Date of Patent: Dec. 4, 2018

(54) DRIVE UNIT FOR A MOTOR VEHICLE, MOTOR VEHICLE FITTED WITH SUCH A DRIVE UNIT AND COMPUTER SOFTWARE PRODUCT FOR CONTROLLING THE DRIVE UNIT

(71) Applicant: GM GLOBAL TECHNOLOGY OPERATIONS LLC, Detroit, MI (US)

(72) Inventors: Lutz Kilian Cloos, Ruesselsheim (DE); Claus Juergen Glahn, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 15/203,332

(22) Filed: Jul. 6, 2016

(65) Prior Publication Data
US 2017/0009678 A1    Jan. 12, 2017

(30) Foreign Application Priority Data
Jul. 7, 2015   (DE) .................... 20 2015 004 831 U

(51) Int. Cl.
*F02D 41/00*    (2006.01)
*F02B 37/18*    (2006.01)
(Continued)

(52) U.S. Cl.
CPC .......... *F02D 41/0007* (2013.01); *F02B 37/04* (2013.01); *F02B 37/18* (2013.01);
(Continued)

(58) Field of Classification Search
CPC .. F02D 41/0007; F02D 41/26; F02D 41/0005; F02D 41/18; F02D 41/123;
(Continued)

(56) References Cited

U.S. PATENT DOCUMENTS

| | | | | |
|---|---|---|---|---|
| 4,730,457 A | * | 3/1988 | Yamada | F02B 37/04 60/609 |
| 6,062,026 A | * | 5/2000 | Woollenweber | F02B 37/04 60/605.2 |

(Continued)

OTHER PUBLICATIONS

German Patent Office, German Search Report for German Application No. 202015004831.5, dated Feb. 29, 2016.

*Primary Examiner* — Hieu T Vo
*Assistant Examiner* — Sherman Manley
(74) *Attorney, Agent, or Firm* — Lorenz & Kopf, LLP

(57) ABSTRACT

A drive unit for a motor vehicle includes an internal combustion engine having a feeder line for feeding combustion air to the internal combustion engine and a compressor device that cooperates with the feeder line and by means of which the combustion air is compressed for the internal combustion engine. A bypass line opens into the feeder line, and through which the combustion air can be fed to the internal combustion engine without passing through the compressor device. An isolating mechanism associated with the bypass line serves to shut off and/or adjust the quantity of combustion air that flows through the bypass line. A control unit controls the isolating mechanism in such a manner that the isolating mechanism is at least partly closed or is caused to at least partly close when the internal combustion engine is in coasting mode.

20 Claims, 4 Drawing Sheets

(51) Int. Cl.

| | |
|---|---|
| *F02D 23/00* | (2006.01) |
| *F02D 9/10* | (2006.01) |
| *F02D 41/26* | (2006.01) |
| *F02B 37/04* | (2006.01) |
| *F02B 39/04* | (2006.01) |
| *F02B 39/12* | (2006.01) |
| *F02D 41/12* | (2006.01) |
| *F02D 41/18* | (2006.01) |
| *F02B 39/10* | (2006.01) |

(52) U.S. Cl.
CPC ............. *F02B 39/04* (2013.01); *F02B 39/12* (2013.01); *F02D 9/1065* (2013.01); *F02D 23/00* (2013.01); *F02D 41/0005* (2013.01); *F02D 41/26* (2013.01); *F02B 39/10* (2013.01); *F02D 41/123* (2013.01); *F02D 41/18* (2013.01); *Y02T 10/144* (2013.01); *Y02T 10/42* (2013.01)

(58) Field of Classification Search
CPC ........ F02D 9/1065; F02D 23/00; F02B 39/12; F02B 39/04; F02B 39/10; F02B 37/04; F02B 37/18; Y02T 10/42; Y02T 10/44

See application file for complete search history.

(56) References Cited

U.S. PATENT DOCUMENTS

| | | | | |
|---|---|---|---|---|
| 6,079,211 | A * | 6/2000 | Woollenweber | F02B 37/025 60/602 |
| 6,622,710 | B2 * | 9/2003 | Hasegawa | F02B 29/0418 123/563 |
| 6,684,863 | B2 * | 2/2004 | Dixon | F02B 39/10 123/559.1 |
| 6,922,995 | B2 * | 8/2005 | Kawamura | F02B 33/36 123/561 |
| 8,763,385 | B2 * | 7/2014 | Leone | F02D 11/10 123/1 R |
| 8,931,271 | B2 * | 1/2015 | Fontvieille | F02D 23/00 60/602 |
| 8,943,823 | B2 * | 2/2015 | Fiveland | F01N 5/02 123/562 |
| 9,200,578 | B2 * | 12/2015 | Flohr | F02B 37/001 |
| 9,435,271 | B2 * | 9/2016 | Leone | F02D 9/1055 |
| 9,644,641 | B2 * | 5/2017 | An | F04D 29/5806 |
| 9,840,972 | B2 * | 12/2017 | Bevan | F02D 23/005 |
| 2007/0044470 | A1 | 3/2007 | Sumser et al. | |
| 2007/0119391 | A1 * | 5/2007 | Fried | F02B 47/02 123/25 A |
| 2009/0194044 | A1 * | 8/2009 | Nishida | F01D 15/10 123/41.02 |
| 2013/0000613 | A1 * | 1/2013 | Meano | F02D 41/064 123/565 |
| 2014/0053547 | A1 * | 2/2014 | Wade | F02B 37/04 60/599 |
| 2014/0144412 | A1 * | 5/2014 | An | F02B 39/10 123/562 |

* cited by examiner

US 10,145,318 B2

DRIVE UNIT FOR A MOTOR VEHICLE, MOTOR VEHICLE FITTED WITH SUCH A DRIVE UNIT AND COMPUTER SOFTWARE PRODUCT FOR CONTROLLING THE DRIVE UNIT

CROSS-REFERENCE TO RELATED APPLICATION

This application claims priority to German Patent Application No. 202015004831.5, filed Jul. 7, 2015, which is incorporated herein by reference in its entirety.

TECHNICAL FIELD

The present disclosure pertains to a drive unit for a motor vehicle and a motor vehicle having a drive unit of such kind. The present disclosure relates further to a computer software product for controlling the drive unit.

BACKGROUND

Modern drive units include an internal combustion engine, for example a four-stroke gasoline or Diesel engine, in which the combustion air is compressed to a pressure greater than atmospheric pressure to improve performance. Depending on the variant, the drive unit includes one or more, typically two compression stages. Drive units with one compression stage are usually equipped with a turbocharger device or a compressor device including a compressor. Drive units with two compression stages include either two turbocharger devices or a turbocharger device and a compressor device. The compressor device may include a rotary compressor in the form of a Roots-type supercharger, for example. Whereas the turbocharger device is driven by the exhaust gas enthalpy of the exhaust gases in the internal combustion engine, the compressor device is driven either by the internal combustion engine itself or by means of an electric motor. Internal combustion engines in which the combustion air is compressed are often also called "forced induction" internal combustion engines.

If the compressor device is driven by the internal combustion engine itself, the compression performance provided by the compressor increases with the speed of the internal combustion engine. In this case, a coupling device may be provided, with which the compressor device can be coupled to the internal combustion engine or uncoupled therefrom depending on the speed of the internal combustion engine, At low engine speeds, the compressor device delivers only a fraction of its compression capability, as a result of which the torque output from the internal combustion engine is low at low engine speeds. Since the turbocharger device's compression performance depends on the pressure in the discharge line, which also increases with the speed of the engine, the output even from internal combustion engines with two-stage supercharging is low at low engine speeds, which is particularly noticeable as a negative phenomenon during an acceleration operation. Accordingly, this behavior is referred to as poor response behavior of the internal combustion engine.

Particularly in high-performance engines, the compressor device must have relatively large dimensions in order to cover a sufficiently wide operating area. However, as the compressor becomes larger, a not inconsiderable portion of the torque delivered by the internal combustion engine is required to drive the compressors, which not only exacerbates the drawback of weak torque at low engine speeds described previously, but also increases fuel consumption.

If the compressor device is driven by an electric motor, the speed of the compressor can be set and altered independently of the speed of the internal combustion engine. In this case, it is not absolutely necessary to arrange a coupling device between the compressor and the electric motor. When an electric motor is used, the response behavior of the internal combustion engine can he improved, but then the electric motor must supply a certain output to bring the compressor up to the optimal speed, thus entailing increased consumption of electrical energy. Since the electrical energy is provided by a generator, which is driven by the internal combustion engine, the increased consumption of electrical energy also causes increased fuel consumption.

Particularly given the ongoing efforts to lower $CO_2$ emissions, increased fuel consumption by internal combustion engines with one or two compression stages is undesirable.

SUMMARY

The present disclosure is directed to a drive unit having one or two compression stages. The internal combustion engine not only delivers good torque output even at low engine speeds, and thus also exhibiting good response behavior, but can also be operated with reduced fuel consumption.

One embodiment of the drive unit for a motor vehicle is equipped with an internal combustion engine, a feeder line for feeding combustion air to the internal combustion engine, a compressor that cooperates with the feeder line, and which is usable for compressing the combustion air for the internal combustion engine, and a bypass line that opens into the feeder line and through which the combustion air can be fed to the internal combustion engine without passing through the compressor device. An isolating mechanism is assigned to the bypass line and serves to close off and/or adjust the quantity of combustion air flowing through the bypass line. A control unit controls the isolating mechanism in such a manner that the isolating mechanism is at least partly closed or is caused to partly close when the internal combustion engine is in a coasting mode.

Coasting mode, also referred to as freewheeling, is defined as follows. The internal combustion engine and the drive unit are in coasting mode when the motor vehicle is travelling and the internal combustion engine is engaged, that is to say the engine is connected to the drivetrain via the main coupling, but the driver does not actuate the gas pedal. In coasting mode, fuel is not injected into the cylinders, because the internal combustion engine does not need to transmit aloud. The pistons in the internal combustion engine move under the effect of the mass inertia of the motor vehicle, so combustion air is drawn in. The control unit detects that the internal combustion engine and the drive unit are in coasting mode. To do this, the control unit is able to cooperate with sensors, which capture the speed of the motor vehicle or the coupling state of the main coupling in the motor vehicle's drivetrain for example.

In conventional drive units, the isolating mechanism is open in coasting mode, which means that the combustion air flows through the bypass line, not through the compressor device, no the load is removed from the compressor device. Consequently, the combustion air is not compressed, and it does not need to be because an air-fuel mixture for ignition is not being produced anyway, and the internal combustion engine does not need to transfer any load. In contrast to this, according to the present disclosure, the isolating mechanism is at least partly and in particular completely or substantially completely closed when the internal combustion engine is in coasting mode, so that at least some of the combustion air flows through the compressor device. If the isolating mechanism is already partly and in particular completely or substantially completely closed, this state is maintained. Consequently, the enthalpy in the combustion air acts on the compressor device, causing the speed of the compressor device to increase. When the internal combustion engine is switched from coasting mode to partial or full load operation and is required to transfer load, compressed combustion air is available immediately, the compressor device does not first have to be accelerated to a speed at which it was previously running in coasting mode due to the effect of the enthalpy of the combustion air. The response behavior of the internal combustion engine is improved with respect to that of known drive units. Since the power for increasing the rotating speed does not have to be supplied by either the internal combustion engine or the electric motor, fuel consumption and consequently $CO_2$ emissions are also reduced.

A refinement of the drive unit as suggested is characterized in that the drive unit is equipped with a throttle valve allocated to the internal combustion engine, which valve cooperates with the feeder line, and the control unit controls the throttle valve in such a manner that the throttle valve is at least partly open or at least partly opened when the internal combustion engine is in coasting mode and the isolating mechanism is at least partly closed.

The throttle valve serves to alter the quantity of combustion air that flows through the feeder line to the internal combustion engine, thereby altering the load on the internal combustion engine. In conventional drive units, the throttle valve is at least partly closed in coasting mode, since the internal combustion engine does not have to transfer any load. In contrast to this, according to the present disclosure, the throttle valve is at least partly, particularly completely or substantially completely open in coasting mode, If said valve is at already least partly, particularly completely or substantially completely open, this state is maintained. This ensures that the flow of combustion air through the feeder line to the internal combustion engine is disturbed as little as possible by the throttle valve. The wider the throttle valve is opened, the less the flow of combustion air is disturbed. Consequently almost all of the enthalpy of the combustion air is available for increasing the speed of the compressor device, and its speed in coasting mode can be increased further.

A further variant relates to a drive unit for a motor vehicle particularly according to one of the preceding variations, including an internal combustion engine, a feeder line for feeding combustion air to the internal combustion engine, a compressor device that cooperates with the feeder line, and by means of which the combustion air for the internal combustion engine is compressible, bypass line that opens into the feeder line and through which the combustion air may be fed to the internal combustion engine without passing through the compressor device. An isolating mechanism is assigned to the bypass line and serves to close off and/or adjust the quantity of combustion air flowing through the bypass line, and having a control unit with which the isolating mechanism may be controlled. The control unit acts in controlling manner on the isolating mechanism in such a manner that the isolating mechanism is at least partly closed or is caused to at least partly close when the internal combustion engine is operated below or at full suction load.

Full suction load is understood to mean a full load state reached by an internal combustion engine which is reached without forced induction or at least substantially without forced induction or with negligible forced induction of the combustion air that is fed to the internal combustion engine. The drive units that are usually used for the compressor device such as the internal combustion engine itself or an electric motor are not active and/or are decoupled.

In this embodiment as well, the isolating mechanism may be completely, substantially completely or partly closed or caused to close. If it has already been partly closed, this state is maintained. This enables at least a portion of the combustion air to flow through the compressor device even below or at the full suction load of the internal combustion engine, to that the enthalpy in the combustion air can he used to increase the speed of the compressor device. This also provides the advantages described previously of reduced fuel consumption with improved response behavior of the internal combustion engine in coasting mode.

In a variant, the control unit acts on the isolating mechanism in such a manner that in coasting mode or when the internal combustion engine is operating below or at its full suction load the isolating mechanism is at least partly opened, for example completely or substantially completely opened, when the quantity of combustion air fed to the internal combustion engine exceeds a predetermined value. The quantity of combustion air supplied to the internal combustion engine may be recorded by flowmeter or a pressure sensor, for example. As was described earlier, the isolating mechanism is completely or partly closed below or at full suction load. Consequently, at least a portion of the combustion air flows through the compressor device and is compressed there. In this circumstance, however, the danger arises that the compressor device, and particularly the rotating compressor may reach an excessively high rotating speed, which may result in damage to the compressor device. To avoid this, the isolating mechanism is opened when a predetermined quantity of combustion air is exceeded, so that at least a portion of the combustion air flows through the bypass line and so does not contribute to an increase in rotating speed.

In a further development, the drive unit is equipped with a throttle valve, which is allocated to the internal combustion engine, and which cooperates with the feeder line and is moved between an open position and a closed position. The control unit controls the throttle valve in such a manner that the throttle valve is moved towards its closed position, and is completely or substantially closed for example when the internal combustion engine is in coasting mode or operating below or at its full suction load, if the quantity of combustion air supplied to the internal combustion engine exceeds a predetermined value. In this context, the throttle valve may be the same as the valve described previously. However, it is also possible to provide another throttle valve in addition to or instead of the throttle valve described previously. The term open position understood to describe the position of the throttle valve in which it has opened completely. Similarly, the term closed position is understood to refer to position of the throttle valve in which it is closed as completely as possible. When the internal combustion engine is operating, the throttle valve in the closed position is typically not completely closed, since otherwise the internal combustion engine would stall. in the closed position, however, the internal combustion engine does not transfer any load.

The movement of the throttle valve towards its closed position has the effect of constricting the cross section of the feeder line inside the throttle valve through which the compression air can flow. Consequently, the quantity of combustion air that flows through the feeder line is also reduced. The quantity of combustion air flowing through the feeder line is reduced substantially by a reduction of the flow velocity of combustion air caused by a throttle valve. In this way too, the compressor device is prevented from increasing to speeds that might cause damage.

In a further variant, the compressor device is driven by the internal combustion engine and/or by a further drive unit, particularly an electric motor. At least one coupling device is provided to decouple the compressor device from the internal combustion engine and/or the further drive unit. The capability to decouple the compressor device from the internal combustion engine or the further drive unit and couple it therewith again has the effect of enabling the compressor device to be adapted to the respective operating state of the internal combustion engine at the time of coupling or decoupling. If the compressor device is driven by the internal combustion engine itself, the speed of the internal combustion engine and the speed of the compressor device are in a fixed ratio to one another. Depending on the transmission ratio, given a low speed of the internal combustion engine, it may be that the compressor device rotates at a speed that is too low to produce detectable compression. In such a case, the torque the internal combustion engine has to transfer to the compressor device is not being used optimally, and the response behavior of the internal combustion engine is deteriorated. The coupling device makes it possible for the compressor device not to be coupled until the rotating speed delivered by the internal combustion engine is fast enough to produce detectable compression. The response behavior of the internal combustion engine is improved due to the fact that the internal combustion engine reaches the rotating speed range at which it outputs maximum torque more quickly, since the compressor device does not have to be accelerated at the same time.

In a further variant, the control unit controls the coupling device in such a manner that the compressor device is or can be at least partly decoupled from the internal combustion engine and/or the further drive unit when the internal combustion engine is in coasting mode or when the internal combustion engine is operated below or at its full suction load. Both in coasting mode and when operated at or below full suction load, the compressor device is at least decoupled from the internal combustion engine or, if the compressor device has already been at least decoupled, the decoupled state is maintained. In particular, the compressor device is decoupled completely or substantially completely. The same also applies if the compressor device is driven by an electric motor or a further drive unit. In the decoupled state, the compressor device can rotate freely, detached from the components that may be connected to it via the coupling device, particularly the drive units thereof. Consequently, the compressor device is not required to accelerate the components that may be connected to it, so that the enthalpy in the combustion air may be used entirely to accelerate the compressor device and bring it to a faster rotating speed. This also represents a further contribution to improving the internal combustion engine's response behavior will at the same time economizing on fuel.

If the compressor device is driven by the internal combustion engine, the compressor device is not coupled with it until the internal combustion engine is being operated at a sufficiently high rotating speed. Special rotation ratios are not necessary. The coupling device undergoes a soft startup, so the compressor device is not subjected to a sudden change of speed. Consequently, the internal combustion engine only has to accelerate the compressor device by a relatively small amount, In this way, although only to a very small degree, the compressor device assists the internal combustion engine in accelerating the motor vehicle, since the compressor device transfers a torque to the internal combustion engine until a certain point after coupling. Only after that point does the internal combustion engine transfer the torque to the compressor. To this extent, the compressor device functions as a flywheel in a very limited way, and stores the enthalpy in the combustion air in the form of rotating energy due to the mass inertia of the rotating parts.

If the compressor device is driven by an electric motor, the electric motor may be switched currentless in coasting mode or until full suction load is reached, the effect of which is that the compressor device turns the rotor of the electric motor as well. In this case, the enthalpy of the combustion air must also be used to accelerate the rotor as well, but this becomes less disadvantageous as the size and weight of the rotor become smaller. However, the larger the electric motor becomes, and accordingly the heavier the rotor, the more advantageous it becomes to use the compressor device with electric motors as well. If the compressor device is decoupled from the electric motor and the rotor, the rotor is not caused to rotate in coasting mode or until full suction load, and consequently all or practically all of the enthalpy in the combustion air is available for increasing the rotating speed of the compressor device, so the provision of the coupling device makes it possible to bring the compressor device to higher speeds than without a coupling device, The effects of improved response behavior with reduced fuel consumption are amplified in this way.

In a further variant, the drive unit includes a turbocharger device with a turbocompressor and an exhaust gas turbine that drives the turbocompressor, the turbocompressor cooperates with the feeder line, and is disposed upstream of the compressor device and/or the bypass line when seen in direction of supply of the combustion air, the exhaust gas turbine is arranged in a discharge line of the drive unit, a waste gate line is provided that opens into the discharge line, and via which the exhaust gas may be discharged without passing through the exhaust gas turbine, and an additional isolating mechanism is assigned to the waste gate line, which mechanism serves to shut off and/or adjust the quantity of exhaust gas that flows through the waste gate line.

The combination of compressor device and turbocharger device makes even greater compression values achievable, and therefore the internal combustion engine can be operated with yet greater loads. Since two differently driven compressor types are used, each of which reaches its optimum compression value at different speeds of the internal combustion engine, overall a more uniform compression over the rotating speed range of the internal combustion engine is achieved. The rotating speed of the turbocharger device depends on the exhaust gas enthalpy contained in the exhaust gas. It is also possible with the aid of the waste gate line to alter the quantity of exhaust gas that flows through the waste gate line and the exhaust gas turbine. This represents another way to adjust the rotating speed of the turbocompressor with certain limits.

In a further development of the drive unit, the control unit controls the additional isolating mechanism in such way that the additional isolating mechanism is at least partly closed or caused to partly close when the internal combustion engine is in coasting mode or when the internal combustion engine is operated below or at full suction load. in this context, the additional isolating mechanism may be completely, substantially completely or partly closed. If it is already completely or partly closed, this state is maintained. This enables a larger quantity of exhaust gas to be delivered to the exhaust gas turbine, leading to an increase in the speed of the turbocompressor and greater compression of the combustion. Accordingly, a greater quantity of combustion air then flows through the compressor device, so that the compressor device may be brought to a faster rotating speed than without the turbocharger device. This in turn further improves the response behavior of the internal combustion engine.

The drive unit is developed further to the effect that the control unit controls the isolating mechanism in such a manner that the additional isolating mechanism is at least partly closed or caused to at least partly close when the isolating mechanism is at least partly closed. In particular, the isolating mechanism is completely or substantially completely closed when the additional isolating mechanism is completely or substantially completely closed or caused to completely or substantially completely close. The more completely the additional isolating mechanism is closed, the more exhaust gas flows through the exhaust gas turbine, which in turn increases the speed of the turbocompressor. The faster the turbocompressor turns the more intensely the combustion air is compressed. Since at the same time the isolating mechanism is at least partly closed, some of the compressed combustion air flows through the compressor device and brings it to a fast rotating speed. In this way, it is possible to influence the speed of the compressor device via the isolating mechanism and the additional isolating mechanism.

In another variant of the drive unit, the control unit controls the additional isolating mechanism in such a manner that when the internal combustion engine is in coasting mode or the internal combustion engine is operated below or at its full suction load the additional isolating mechanism at least partly open when the quantity of combustion air delivered to the internal combustion engine exceeds a predetermined value or the predetermined value. In particular, the additional isolating mechanism is completely or substantially completely opened. As was described previously, when the drive unit is operated it may happen that the speed of the compressor device increase to such a point that the compressor device can be damaged. Because the additional isolating mechanism is completely or partly opened, some of the exhaust gas flows through the waste gate line, thereby reducing the rotating speed of the turbocompressor. As a direct consequence of this, the combustion air undergoes less intense compression, thereby causing the speed of the compressor device to fall below a dangerous value, or preventing the speed from rising to a dangerous value at all. Moreover, opening the additional isolating mechanism also serves to prevent the exhaust gas turbine and the turbocompressor from increasing to a damaging value.

From the preceding notes it will be evident that that the compressor device may be exposed to the enthalpy in the combustion air for as long as possible, in order to increase the rotating the speed of the compressor device as far as possible. Since only the enthalpy that is contained in the combustion air anyway is used for this, neither the internal combustion engine nor the electric motor or any further drive unit of the compressor device needs to provide the output necessary for this, which in turn results in reduced fuel consumption. Since the compressor device is brought to the corresponding rotating speed in coasting mode or at or below its full suction load, the compression achieved thereby is available immediately, particularly when switching to full load operation. Thus it is no longer necessary to wait until the compressor device has been accelerated to said rotating speed, so that the response behavior of the internal combustion engine is improved and the motor vehicle is accelerated more quickly.

A controller for the purposes of the embodiments of the present disclosure described previously may be in the form of hardware and/or software, for example as a software program or software program module. The pressure sensor may also be in the form of hardware and/or software, for example as a software program or software program module for the purposes of the embodiments of the present disclosure described previously.

The controller, control unit and/or pressure sensors may particularly each be equipped with a digital processing unit or a shared digital processing unit, which preferably includes a microprocessor unit (CPU). The CPU may be connected to a storage system and/or a bus system by a data and/or signal link. Further, the controller may be equipped individually with or share one or more programs or program modules. The digital processing unit may be constructed in such a manner that commands which are implemented as a program stored in a storage system are processed in sequence, input signals are received by a data bus system and/or output signals are forwarded to a data bus system. A storage system may include one or more, particularly different, storage media. The storage media may particularly be optical, magnetic, solid state and/or other, preferably non-volatile storage media.

A drive unit for the purposes of the embodiments described previously may also include control means, which may be understood to be function module architecture. Such a function module architecture includes at least one function block, so that a control system of the drive unit amounts to a device having means for carrying out a procedure that is defined by the mode of operation of the drive unit. In this context, the control system, which includes the control unit and/or the pressure sensor for example, corresponds to the function block described.

A further aspect relates to a motor vehicle having a drive unit according to one of the embodiments described in the preceding text. The technical effects and advantages that are to be gained with the motor vehicle as suggested correspond to those that have been discussed with regard to the drive unit as suggested. In summary, the reduced fuel consumption with better response behavior of the internal combustion engine is particularly notable.

A further aspect relates to a computer software product with a software code which is stored on a computer-readable medium and designed for controlling the isolating mechanism, an additional isolating mechanism and/or the throttle valve of a drive unit according to one of the aforementioned embodiments. The isolating mechanism is caused to at least partly close, in particular a drive unit of the compressor device is also switched off or at least partly decoupled when the internal combustion engine is in a coasting mode and/or the internal combustion engine is operated below or at its full suction load. With the computer software product, it is possible to control the drive unit in such a manner that fuel consumption is reduced and the response behavior of the internal combustion engine is improved.

In a variant of the computer software product, the throttle valve is at least partly opened in coasting mode and when the isolating mechanism is at least partly closed. The wider the throttle valve is opened, the more smoothly the combustion air is able to flow through the feeder line, which enables the compressor device to reach particularly high rotating speeds, thus in particular lending a noticeable improvement to the response behavior of the internal combustion engine.

In an alternative variant of the computer software product, when the internal combustion engine is operated below or at its full suction load, the isolating mechanism is at least partly opened and/or the throttle valve may be moved towards its closed position if the quantity of combustion air being fed to the internal combustion engine exceeds a predetermined value. This serves to prevent the speed of the compressor device from reaching values at which the compressor device might be damaged.

In a refinement of the computer software product, in which the drive unit is a turbocharger device equipped with a turbocompressor and an exhaust gas turbine that drives the turbocompressor, the turbocompressor cooperates with the feeder line and is located upstream of the compressor device and/or the bypass line viewed in the feed direction of the combustion, the exhaust gas turbine is arranged in a discharge line of the drive unit, a waste gate line opening into the discharge line is provided, via which the exhaust gas may be discharged without passing through the exhaust gas turbine, and an additional isolating mechanism is assigned to the waste gate line and is used to shut off and/or adjust the quantity of exhaust gas that flows through the waste gate line.

The additional isolating mechanism is at least partly closed when the internal combustion engine is in coasting mode or the internal combustion engine is operated below or at its full suction load. In particular, the additional isolating mechanism is completely or substantially completely closed. The effect of this is that a greater quantity of exhaust gas is fed to the exhaust gas turbine, thereby increasing the speed of the turbocompressor and leading to more intense compression of the combustion air, Consequently, a greater quantity of combustion air passes through the compressor device, so that the compressor device may be brought to a faster rotating speed than without the turbocharger device. This in turn further improves the response behavior of the internal combustion engine.

In a further development of the computer software product, the additional isolating mechanism is at least partly closed when the isolating mechanism is at least partly closed. In particular, the additional isolating mechanism is completely or substantially completely closed. when the isolating mechanism is completely or substantially completely closed. The more completely the additional isolating mechanism is closed, the more exhaust gas flows through the exhaust gas turbine, thereby increasing the rotating speed of the turbocompressor. In turn, the faster the turbocompressor rotates, the more intensely the combustion air is compressed. Since at the same time the isolating mechanism is at least partly closed, a portion of the combustion air flows through the compressor device and increases the speed thereof. Thus it is possible to influence the speed of the compressor device via the isolating mechanism and the additional isolating mechanism.

In a further development of the computer software product, when the internal combustion engine is in coasting mode or the internal combustion engine is operated below or at its full suction load, the additional isolating mechanism is at least partly opened when the quantity of combustion air fed to the internal combustion engine exceeds a predetermined value or the predetermined value. As was described previously, it can happen during operation of the drive unit that the speed of the compressor device increases to such a level that there is a danger of damaging the compressor device. When the additional isolating mechanism is completely or partly opened, a portion of the exhaust gas flow passes through the waste gate line, and the rotating speed of the turbocompressor is reduced thereby. As a direct consequence of this, the combustion air is compressed less intensely, and for this reason the speed of the compressor device falls or does not even rise to a hazardous level. In addition, opening the additional isolating mechanism also serves to prevent the exhaust gas turbine and the turbocompressor from reaching a damaging level.

A further embodiment of the present disclosure relates to a control unit and a control and/or regulating device with a computer software product according to any of the embodiments described previously. As with the computer software product, with the control unit and control and/or regulating device it is possible to control the drive unit in such a manner that fuel consumption is reduced and the response behavior of the internal combustion engine is improved.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
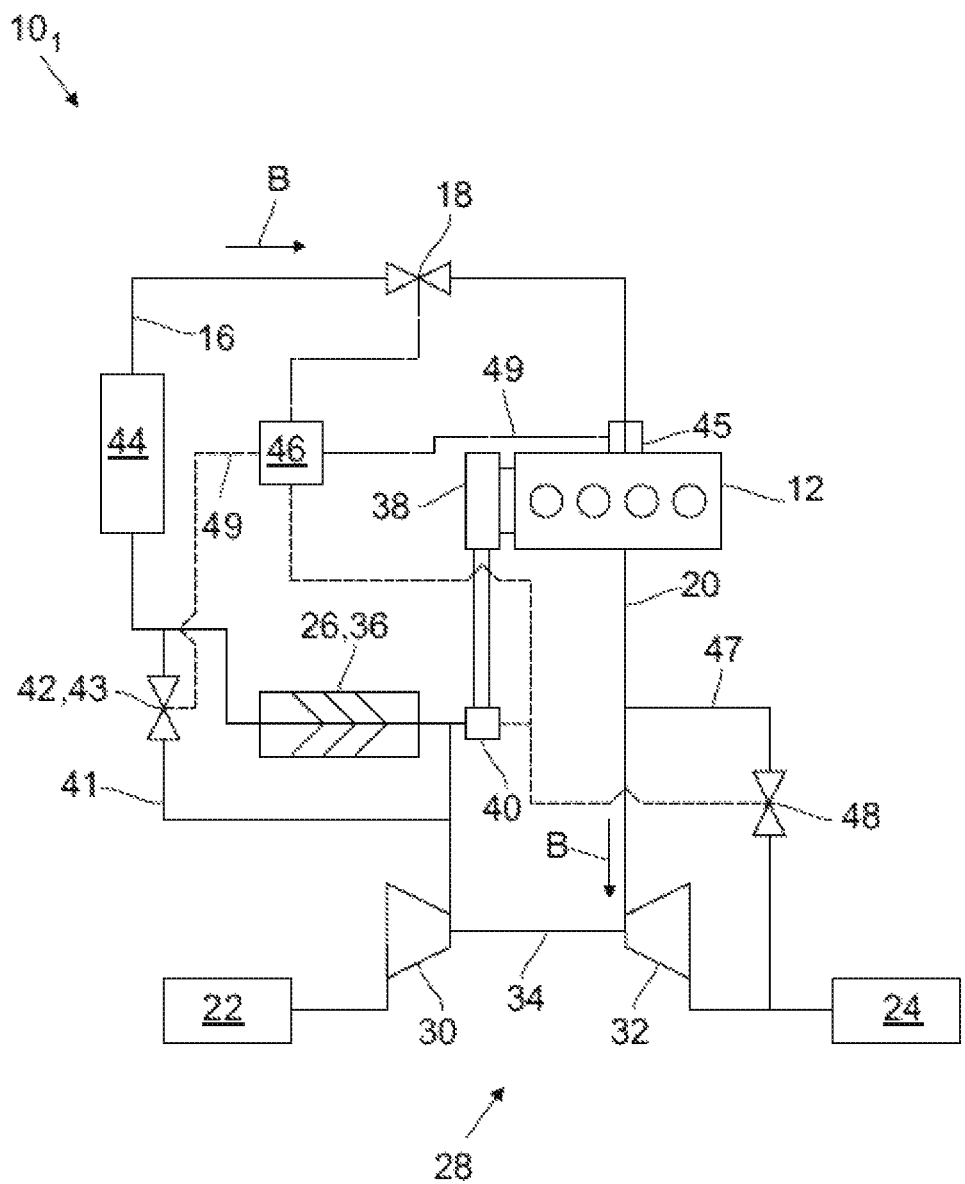
FIG. 1 is a schematic diagram of a first embodiment of a drive unit.

FIG. 1 shows schematic diagram representing a drive unit $10_1$ according to a first embodiment for driving a motor vehicle (not shown). Drive unit $10_1$ includes an internal combustion engine 12, which supplied the necessary power for driving the motor vehicles, which may be for example a four-cylinder gasoline or Diesel engine. Internal combustion engine 12 typically functions according to the four-stroke principle, although a two-stroke principle is also conceivable here. Drive unit 10 includes a feeder line 16, via which combustion air may be supplied to internal combustion engine 12. A throttle valve 18 is arranged in feeder line 16, and is movable between an open position, in which it is completely open, and a closed position, in which it is closed as far as possible, in the open position, internal combustion engine 12 may be operated with maximum load, whereas in the closed position internal combustion engine 12 may be operated in coasting mode. The exhaust gases that are generated by combustion of the mixture of combustion air and fuel are discharged by internal combustion engine 12 via a discharge line 20. In order to draw the combustion air in from the surrounding atmosphere, internal combustion engine 12 may be equipped with an intake device 22, which may include an air filter. Discharge line 20 is equipped with an exhaust gas treatment system 24, which may include catalytic converters and filters, particularly particulate filters to filter and/or convert the toxic components contained in the exhaust gas into non-toxic compounds. The direction of flow of the combustion air and exhaust gases through feeder line 16 and discharge line 20 is indicated by arrows B.

Drive unit $10_1$ includes a compressor device 26 which cooperates with and compresses the combustion air in feeder line 16. Compressor device 26 includes a compressor 36, which in the example shown is driven via a driven shaft 38 of internal combustion engine 12 and is connectable optionally to internal combustion engine 12 or driven shaft 38 via a coupling device 40. Compressor 36 has the form of a rotary compressor. Coupling device 40 may be realized as an electromagnetic coupling device 40, for example. Drive unit $10_1$ further includes a turbocharger device 28, which is arranged upstream of compressor device 26 when viewed in the direction of flow of the combustion air to internal combustion engine 12. Turbocharger device 28 includes a turbocompressor 30 arranged in feeder line 16 and an exhaust gas turbine 32 arranged in discharge line 20, the two being connected to each other via a shaft 34.

Between turbocompressor 30 and compressor 36, a bypass line 41 branches off from feeder line 16 and opens into feeder line 16 again downstream of compressor 36. An isolating mechanism 42 is arranged in bypass line 41 and may be shifted between a completely open position and a completely closed position. In the example shown, isolating mechanism 42 includes a regulator valve 43, which may be shifted steplessly between the open and closed positions. An air cooler 44 for cooling the combustion air that heats up under compression is arranged downstream of the point where bypass line 41 opens into feeder line 16 again. Air cooler 44 is often also called "intercooler".

A pressure sensor 45 is provided to determine the pressure in inlet manifold MAP. A control unit 46 is also present, and is connected to pressure sensor 45 via electrical wires 49 to receive the signals generated by pressure sensor 45. Control unit 46 is also connected to throttle valve 18, coupling device 40 and regulator valve 43, also via electrical wires 49.

A "waste gate line" 47 is provided in discharge line 20, providing the option to bypass the exhaust gas turbine 32 of turbocharger device 26. Waste gate line 47 may be used to adjust the rotating speed of turbocharger device 26 and particularly to prevent turbocharger device 26 from over-rotating. For this purpose, waste gate line 47 includes a regulator valve 48.

Figure 2:
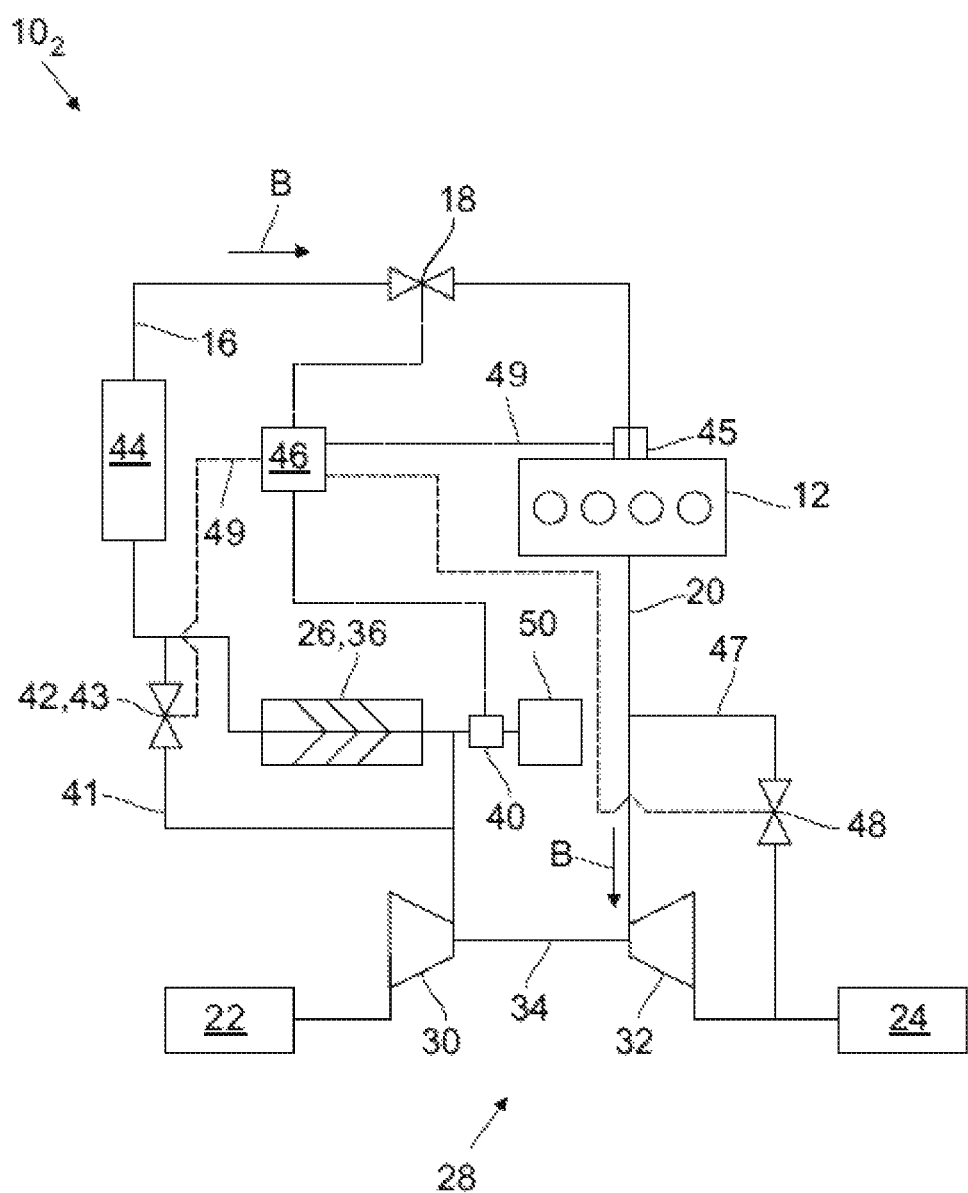
FIG. 2 is a schematic diagram of a second embodiment of the drive unit.

FIG. 2 represents a second embodiment of drive unit $10_2$. This differs from the first embodiment solely in that compressor device 36 is not driven by internal combustion engine 12 but instead by a separate electric motor 50. The electric motor 50 in this case is also connected to compressor 36 via a coupling device 40 and may be disconnected from it again.

However, it should be noted at this point that if compressor device 36 is driven by electric motor 50 it is not essential to provide coupling device 40. Accordingly, the disclosure is intended also to include an embodiment in which electric motor 50 is connected directly to compressor device 36, and coupling device 40 may be entirely absent.

Figure 3:
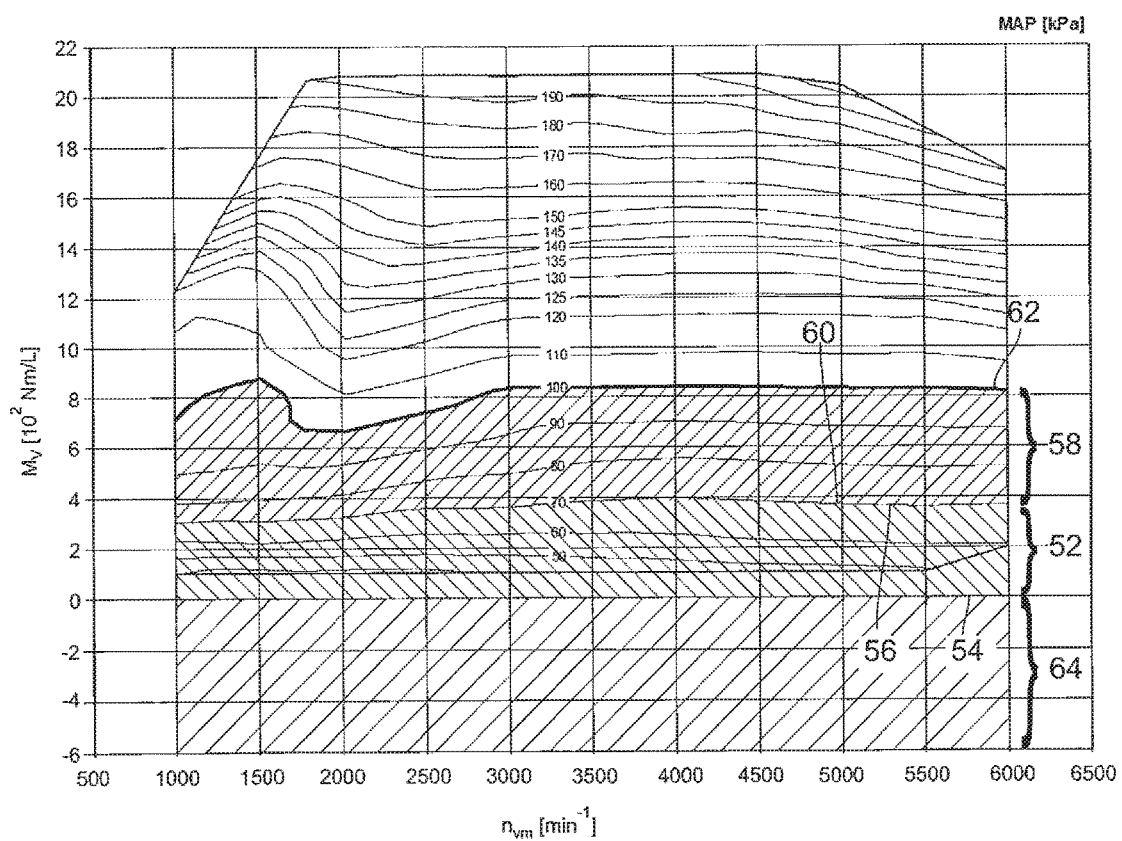
FIG. 3 is a set of characteristic curves for an internal combustion engine to explain the computer program.

FIG. 3 represents a set of characteristic curves for an internal combustion engine 12 that may be operated with the computer program. In this context, the torque $M_V$ generated by internal combustion engine 12 as a function of the volume of its combustion chambers is plotted against the rotating speed of the internal combustion engine $n_{vm}$ for a specific pressure in the intake manifold MAP ("manifold air pressure"), which is recorded by pressure sensor 45 (see also FIGS. 1 and 2). The delivered volume-specific torque $M_V$ represents a different way of expressing brake mean effective pressure BMEP.

For the purposes of the present disclosure, the area of interest is the area in which the MAP is lower than atmospheric pressure, which is approximately 100 kPa. This area is located at or below the full suction load of the internal combustion engine. The set of characteristic curves is divided into a first zone 52 with a first lower limit 54 and a first upper limit 56 and a second zone 58 with a second lower limit 60 and a second upper limit 62. The first upper limit 56 and the second lower limit 60 coincide. In the example shown, the first lower limit 54 is at 0 kPa, the first upper limit 56 and the second lower limit 60 are located at 70 kPa, and the second upper limit is located at 100 kPa, that is to say approximately atmospheric pressure. The graph of the first upper limit 56 and the second lower limit 60 in particular is determined by the characteristics and operating state of the internal combustion engine. As was stated in the introduction, a MAP lower limit of 0 kPa is only conceivable in theory, because this would mean that feeder line 16 housed a vacuum. An MAP lower than 10 kPa will only be recorded in exceptional situations in real life. During normal operation, the MAP will generally barely fall below 30 kPa.

If pressure sensor 45 detects a MAP that is in first zone 52 or second zone 58, drive unit 10 is operated in such a manner that compressor device 36 is disconnected from internal combustion engine 12 or from electric motor 50 by opening coupling device 40 following a corresponding command from control unit 46, if this has not already taken place.

If the MAP is in first zone 52, so butterfly valve 43 in bypass line 41 is completely or partly closed and throttle valve 18 is completely or partly opened. Butterfly valve 43 and throttle valve 18 are also actuated by control unit 46. The combustion air flows entirely through compressor 36 and drives it, thereby increasing its rotating speed without the need for internal combustion engine 12 or electric motor 50 to transfer any torque to compressor 32.

In second zone 58, the MAP has already exceeded first upper limit 56 and second lower limit 60, and this is recorded by pressure sensor 45, In second zone 58, the danger exists that the rotating speed of compressor device 26 will increase to a level at which damage may occur. In this case, throttle valve 18 is moved towards its closed position, and/or butterfly valve 43 is completely or partly opened. Both measures have the effect of reducing the quantity of combustion air that flows through compressor device 26, so that the speed of compressor device 26 is reduced to a non-damaging level or kept below this level.

If the MAP rises above 100 kPa, butterfly valve 43 is closed again and the load of internal combustion engine 12 cannot be changed except via throttle valve 18. In addition, compressor device 26 is connected to internal combustion engine 12 or electric motor 50 by closing of coupling device 40. Again, control unit 45 is tasked with initiating these steps.

Internal combustion engine 12 is operated up to a maximum of full suction load both in first zone 52 and second zone 58, whereas with a MAP of over 100 kPa the combustion air is compressed beyond atmospheric pressure and in this way the internal combustion engine is supplied by forced induction.

If internal combustion engine 12 is in coasting or free-wheeling mode, internal combustion engine 12 does not transfer any load. Instead, its pistons are moved by the motor vehicle's inertia, with the consequence that the volume-specific torque $M_V$ assumes a negative value. This is the case in a third zone 64 of FIG. 3, which represents coasting mode. There is no fixed lower limit to the volume-specific torque $M_V$ in the third zone 64. Instead, it is determined by the mass and speed of the motor vehicles. If internal combustion engine 12 drives a heavy motor vehicle, and the vehicle is switched into coasting mode while travelling at high speed, volume-specific torque $M_V$ takes on greater negative values than if the internal combustion engine 12 is switched to coasting mode in a light motor vehicle travelling at low speed. Coasting mode may be identified by sensors, for example, which calculated the speed of the motor vehicle and the position of the main coupling in the drivetrain of the motor vehicle and forward this information to control unit 46.

If internal combustion engine 12 is in coasting mode, compressor device 26 is decoupled from the internal combustion engine 12 or the electric motor 50 if this has not already taken place. Butterfly valve 43 is also completely or partly closed. If butterfly valve 43 is already closed, it will be kept closed. Throttle valve 18 is opened. All steps are initiated by control unit 45.

As was indicated in the introduction, in real life the MAP cannot fall below a certain value of about 10 to 30 kPa. In the example presented, the lowest measured value for MAP is 50 kPa. Once this lowest MAP has been reached, the MAP will not be affected any more by a falling volume-specific torque. In view of this, no further lines are shown in third zone 64 in the example illustrated.

Figure 4:
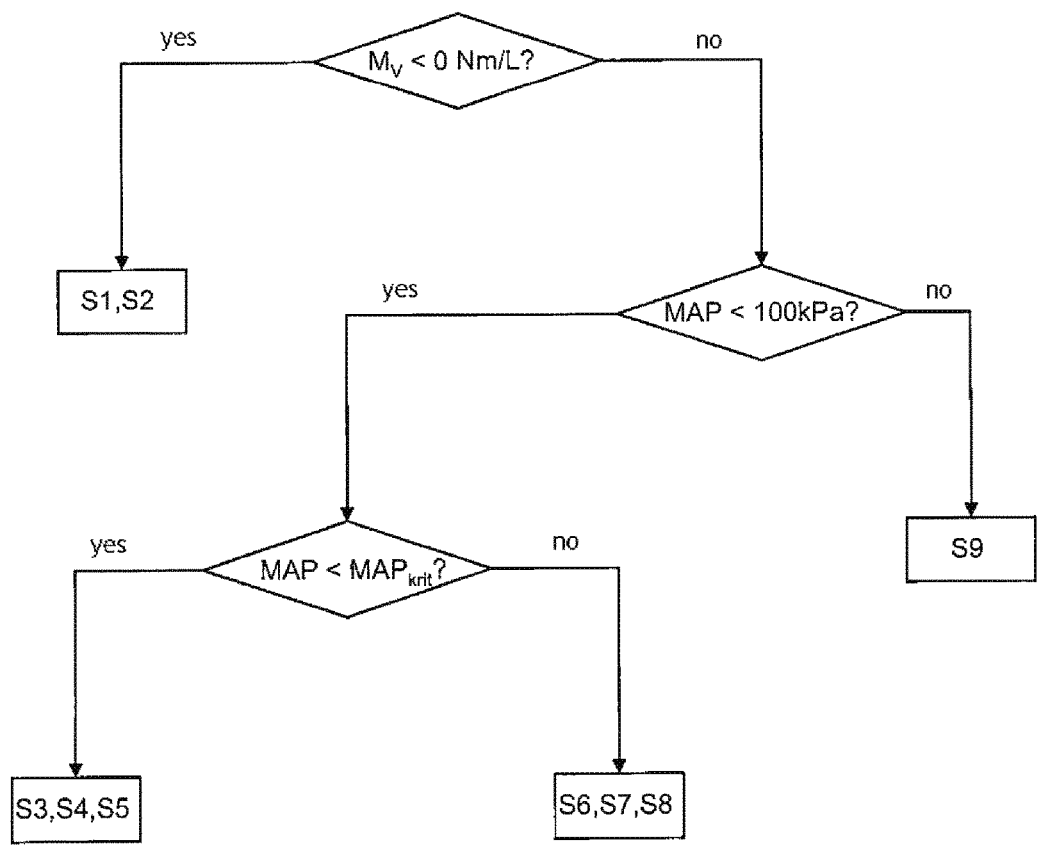
FIG. 4 is a flowchart illustrating a control mode with which the drive unit may be operated.

FIG. 4 is a flowchart representing the various steps that are performed by an embodiment of the computer program running on control unit 45 in order to operate drive unit 10. First, it is determined whether the value delivered by internal combustion engine 12 for volume-specific torque $M_V<0$ Nm/L. This query is equivalent to the question as to whether internal combustion engine 12 is in coasting mode or not. This query does not necessarily have to be made on the basis of a measurement, it can be checked for example by determining whether internal combustion engine 12 is connected to the drivetrain via the main coupling, whether the motor vehicle is moving, and whether throttle valve 18 is closed. If these three questions are answered in the affirmative, internal combustion engine 12 is in coasting mode. However, the engine controller may provide that coasting mode is already assumed when throttle valve 18 is not fully closed. Further criteria may be used to determine whether the internal combustion engine is in coasting mode or not.

If internal combustion engine 12 is in coasting mode, steps S1 and S2 are executed. In step S1, compressor device 36 is decoupled from internal combustion engine 12 or electric motor 50. If this has already taken place, compressor device 36 will remain decoupled. In step S2, the second butterfly valve 43 will be completely or substantially closed, or kept closed, and throttle valve 18 will be fully or partly opened.

If internal combustion engine 12 is not in coasting mode, a calculation is made to determine whether MAP<100 kPa. To this end, pressure sensor 45 may be used. If this is the case, a further check is made to determine whether MAP<$MAP_{krit}$. With reference to FIG. 3, $MAP_{krit}$ corresponds to the first upper limit 56 of first zone 52 and the second lower limit 60 of second zone 58 and is equal to 70 kPa. Other suitable values for $MAP_{krit}$ may also be selected. If the MAP is lower than $MAP_{krit}$, steps S3, S4 and S5 are executed. In step S3, compressor device 36 is decoupled from internal combustion engine 12 or electric motor 50 is this has not already taken place. In step S4, butterfly valve 43 is completely or partly closed, and in step S5 the throttle valve is completely or partly opened.

However, if the MAP is greater than $MAP_{krit}$ but less than 100 kPa, steps S6, S7 and S8 are executed. In S6 compressor device 36 is decoupled from internal combustion engine 12 or electric motor 50, if this has not already taken place. In step S7, throttle valve 18 is moved towards its closed position, and in step S8 the butterfly valve 43 is completely or partly opened.

However, if the MAP is greater than 100 kPa, and therefore greater than atmospheric pressure, in step S9 compressor device 36 is coupled to internal combustion engine 12 or electric motor 50 by closing the coupling device 40. Regulator valve 43 can then be completely closed, although this is not absolutely necessary. The load on internal combustion engine 12 can then be modified with throttle valve 18.

While at least one exemplary embodiment has been presented in the foregoing detailed description, it should be appreciated that a vast number of variations exist, It should also he appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A drive unit for a motor vehicle comprising:
   an internal combustion engine;
   a feeder line configured to feed combustion air to the internal combustion engine;
   at least one sensor configured to detect an operating condition of the internal combustion engine;
   a compressor device fluidly coupled to the feeder line;
   a selective coupling device configured to selectively move between a coupled position and a decoupled position, the selective coupling device, in the coupled position, configured to couple the compressor device to an input shaft for driving the compressor device and compressing the combustion air fed to the internal combustion engine, the selective coupling device, in the decoupled position, configured to decouple the compressor device from the input shaft;
   a bypass line in fluid communication with the feeder line and including an isolating mechanism that is selectively moveable between a closed position and an open position, the bypass line, with the isolating mechanism in the open position, configured to feed the combustion air to the internal combustion engine without passing through the compressor device, the compressor device, with the isolating mechanism in the closed position, configured to receive the combustion air and feed the combustion air to the internal combustion engine; and
   a control unit configured to determine, according to the operating condition detected by the at least one sensor, whether the internal combustion engine is either in a coasting mode or operating below or at a full suction load;
   the control unit configured to move the isolating mechanism away from the open position toward the closed position and move the selective coupling device from the coupled position to the decoupled position as a result of a determination that the internal combustion engine is either in the coasting mode or operating below or at the full suction load.

2. The drive unit according to claim 1, further comprising a throttle valve which cooperates with the feeder line, wherein the control unit is further configured to control the throttle valve such that the throttle valve is at least partly open when the internal combustion engine is in the coasting mode and the isolating mechanism is at least partly closed.

3. The drive unit according to claim 2, wherein the control unit is further configured to control the throttle valve such that the throttle valve is moved towards a closed position when the quantity of combustion air fed to the internal combustion engine exceeds a predetermined value and when the internal combustion engine is either in the coasting mode or operating below or at the full suction load.

4. The drive unit according to claim 1, wherein the control unit is further configured to control the isolating mechanism such that the isolating mechanism moves away from the closed position toward the open position when a quantity of combustion air fed to the internal combustion engine exceeds a predetermined value and when the internal combustion engine is either in the coasting mode or operating below or at the full suction load.

5. The drive unit according to claim 1, wherein the input shaft of the compressor device is configured to be driven in rotation by at least one of the internal combustion engine or an auxiliary motor.

6. The drive unit according to claim 1, wherein the input shaft of the compressor device is configured to be driven in rotation by an auxiliary motor.

7. The drive unit according to claim 1 further comprising:
a turbocharger device with a turbine in fluid communication with an exhaust line of the drive unit and configured to drive a turbocompressor, wherein the turbocompressor is in fluid communication with the feeder line at a point upstream of at least one of the compressor device or the bypass line; and
a waste gate line in fluid communication with the exhaust line and configured to discharge an exhaust gas without passing through the turbine, the waste gate line having a second isolating mechanism configured to adjust a quantity of exhaust gas flowing through the waste gate line.

8. The drive unit according to claim 7, wherein the control unit is further configured to control the second isolating mechanism such that the second isolating mechanism is at least partly closed when the internal combustion engine is either in the coasting mode or operating below or at the full suction load.

9. The drive unit according to claim 7, wherein the control unit is further configured to control the second isolating mechanism such that the second isolating mechanism is at least partly closed when the isolating mechanism is at least partly closed.

10. The drive unit according to claim 7, wherein the control unit is further configured to control the second isolating mechanism such that the second isolating mechanism is at least partly opened when a quantity of combustion air fed to the internal combustion engine exceeds a predetermined value and when the internal combustion engine is either in the coasting mode or operating below or at the full suction load.

11. The drive unit according to claim 1, wherein the at least one sensor is configured to determine whether a volume-specific torque of the internal combustion engine is less than zero;
wherein the control unit determines that the internal combustion engine is in the coasting mode when the at least one sensor detects that the volume-specific torque is less than zero;
wherein the at least one sensor includes a pressure sensor configured to determine whether a pressure of the combustion air is at most equal to a predetermined pressure value; and
wherein the control unit determines that the internal combustion engine is operating below or at the full suction load when the pressure sensor detects that the pressure of the combustion air is at most equal to the predetermined pressure value.

12. A method for operating a drive unit of a motor vehicle comprising:
drawing combustion air through a feeder line to an internal combustion engine, the feeder line in fluid communication with a turbocompressor and a compressor device, the compressor device being downstream of the turbocompressor, the compressor device selectively coupled to and decoupled from an input shaft via a coupling device, the feeder line including a bypass line with a bypass valve, the bypass valve selectively moveable between a closed position and an open position, the combustion air routed to and driving the compressor device when the bypass valve is in the closed position, the combustion air routed through the bypass valve and bypassing the compressor device when the bypass valve is in the open position;
compressing, with the turbocompressor, the combustion air in the feeder line;
detecting, with at least one sensor, an operating condition of the internal combustion engine;
determining, with a control unit according to the detected operating condition, whether the internal combustion engine is either in a coasting mode or operating below or at a full suction load; and
selectively moving, using the control unit, the bypass valve away from the open position toward the closed position and decoupling the compressor device from the input shaft as a result of determining that the internal combustion engine is either in the coasting mode or the internal combustion engine is operating below or at the full suction load.

13. The method according to claim 12 further comprising at least partially opening a throttle valve in the feeder line when the internal combustion engine is in the coasting mode and the bypass valve is at least partly closed.

14. The method according to claim 13 further comprising selectively closing the throttle valve when the quantity of combustion air fed to the internal combustion engine exceeds a predetermined value and when the internal combustion engine is either in the coasting mode or operating below or at the full suction load.

15. The method according to claim 13 further comprising selectively opening the bypass valve when the quantity of combustion air fed to the internal combustion engine exceeds a predetermined value when the internal combustion engine is either in the coasting mode or operating below or at the full suction load.

16. A drive unit for a motor vehicle comprising: an engine;
a feeder line configured to feed combustion air to the engine;
at least one sensor configured to detect an operating condition of the internal combustion engine, the at least one sensor including a pressure sensor;
an exhaust line configured to receive an exhaust gas stream from the engine;
a turbocharger with a turbocompressor and a turbine connected to each other via a shaft, the turbocompressor fluidly connected to the feeder line, the turbine configured to be driven in rotation by the exhaust gas stream and rotate the turbocompressor for compressing the combustion air fed to the internal combustion engine;

a compressor device fluidly connected to the feeder line and disposed downstream in series from the turbocompressor, the compressor device fluidly coupled to the feeder line, the compressor device selectively connected to a motor via a coupling device having a coupled position and a decoupled position, the compressor device, with the coupling device in the coupled position, configured to be driven in rotation by the motor and further compress the combustion air fed from the turbocompressor, the compressor device decoupled from the motor when the coupling device is in the decoupled position;

a compressor bypass line in fluid communication with the feeder line, the compressor bypass line configured bypass the compressor device and feed the combustion air from the turbocompressor to the internal combustion engine, the compressor bypass line having a compressor bypass valve selectively moveable between an open position and a closed position to adjust flow through the compressor bypass line; and a control unit configured to determine, according to the operating condition detected by the at least one sensor, whether the internal combustion engine is in a coasting mode;

the control unit configured to determine, according to a pressure condition detected by the pressure sensor, whether the internal combustion engine is operating, at most, at a full suction load;

the control unit configured to move the compressor bypass valve away from the open position toward the closed position and move the selective coupling device from the coupled position to the decoupled position when the control unit determines that the internal combustion engine is in the coasting mode; and the control unit configured to move the compressor bypass valve away from the open position toward the closed position and move the selective coupling device from the coupled position to the decoupled position when the control unit determines that the internal combustion engine is operating, at most, at the full suction load.

17. The drive unit according to claim 16, wherein the at least one sensor is configured to determine whether a volume-specific torque of the internal combustion engine is less than zero;

wherein the control unit determines that the internal combustion engine is in the coasting mode when the at least one sensor detects that the volume-specific torque is less than zero;

wherein the control unit determines that the internal combustion engine is operating, at most, at the full suction load when the pressure sensor detects that a pressure of the combustion air is, at most, equal to a predetermined pressure value.

18. The drive unit according to claim 16 further comprising a waste gate line in fluid communication with the exhaust line and configured to discharge the exhaust gas stream without passing through the turbine, the waste gate line having a second isolating mechanism configured to adjust a quantity of exhaust gas flowing through the waste gate line;

wherein the control unit is further configured to control the second isolating mechanism such that the second isolating mechanism is at least partly closed when the internal combustion engine is either in the coasting mode or operating, at most, at the full suction load.

19. The drive unit according to claim 16 further comprising a waste gate line in fluid communication with the exhaust line and configured to discharge the exhaust gas stream without passing through the turbine, the waste gate line having a second isolating mechanism configured to adjust a quantity of exhaust gas flowing through the waste gate line;

wherein the control unit is further configured to control the second isolating mechanism such that the second isolating mechanism is at least partly closed when the compressor bypass valve is at least partly closed.

20. The drive unit according to claim 16 further comprising a waste gate line in fluid communication with the exhaust line and configured to discharge the exhaust gas stream without passing through the turbine, the waste gate line having a second isolating mechanism configured to adjust a quantity of exhaust gas flowing through the waste gate line;

wherein the control unit is further configured to control the second isolating mechanism such that the second isolating mechanism is at least partly opened when a quantity of combustion air fed to the internal combustion engine exceeds a predetermined value and when the internal combustion engine is either in the coasting mode or operating, at most, at the full suction load.

* * * * *